United States Patent
Sugawara

(10) Patent No.: US 6,880,777 B2
(45) Date of Patent: Apr. 19, 2005

(54) SPOOL SUPPORT STRUCTURE FOR A SPINNING REEL

(75) Inventor: Ken'ichi Sugawara, Osaka (JP)

(73) Assignee: Shimano Inc., Osaka (JP)

( * ) Notice: Subject to any disclaimer, the term of this patent is extended or adjusted under 35 U.S.C. 154(b) by 9 days.

(21) Appl. No.: 10/726,509

(22) Filed: Dec. 4, 2003

(65) Prior Publication Data
US 2004/0108399 A1 Jun. 10, 2004

(30) Foreign Application Priority Data
Dec. 6, 2002 (JP) .................................. 2002-355128

(51) Int. Cl.$^7$ .................................... A01K 89/015
(52) U.S. Cl. .................. 242/322; 242/321; 242/241; 242/242; 242/246
(58) Field of Search .................. 242/321, 322, 242/241, 242, 246

(56) References Cited

U.S. PATENT DOCUMENTS

| | | | | |
|---|---|---|---|---|
| 5,984,220 A | * | 11/1999 | Kawabe | 242/241 |
| 6,598,819 B1 | * | 7/2003 | Furomoto | 242/319 |
| 6,655,622 B1 | * | 12/2003 | Kitajima et al. | 242/322 |
| 6,679,445 B1 | * | 1/2004 | Morise et al. | 242/322 |
| 6,682,007 B1 | * | 1/2004 | Noda et al. | 242/241 |
| 2002/0125358 A1 | * | 9/2002 | Takikura | 242/319 |
| 2002/0162910 A1 | * | 11/2002 | Hitomi | 242/322 |
| 2003/0001035 A1 | * | 1/2003 | Hitomi | 242/322 |

* cited by examiner

Primary Examiner—Kathy Matecki
Assistant Examiner—Evan Langdon
(74) Attorney, Agent, or Firm—Shinjyu Global IP Counselors, LLP

(57) ABSTRACT

A first bearing and a second bearing are mounted on an inner peripheral side of an inner peripheral portion of a bobbin portion. The first bearing and the second bearing are rotatably mounted on a spool shaft a tubular retaining member. An annular member is mounted to an outer periphery of the spool shaft so as to be prevented from moving rearward relative to the spool shaft. A through hole passes through the retaining member. The retaining member is non-rotatably coupled to the spool shaft by a pin member. A nut member is mounted on the outer periphery of the spool shaft, such that the retaining member is interposed and fixedly held between the annular member and the nut member.

20 Claims, 4 Drawing Sheets

SPOOL SUPPORT STRUCTURE FOR A SPINNING REEL

BACKGROUND OF THE INVENTION

1. Field of the Invention

The present invention relates to a spool support structure for a spinning reel. More particularly, the present invention relates to a spool support structure for a spinning reel for rotatably mounting a spool on a spool shaft that is movable forward and backward with respect to a reel unit.

2. Background Information

A conventional spinning reel generally includes a reel unit that rotatably supports a handle, a rotor, and a spool that is rotatably mounted to a spool shaft. The spool of the spinning reel is movable forward and backward with respect to the reel unit. The spool includes a bobbin portion around the outer periphery of which fishing line is wound and in the inner periphery of which the spool shaft is mounted. The spool also has a large diameter tubular skirt portion that is arranged on the rear end of the bobbin portion. The spool shaft is non-movably mounted on a rear end portion of the bobbin portion. An annular member that limits the rearward movement of the spool is disposed on the rear end portion of the bobbin portion. In addition, a front drag type of spinning reel also includes a drag mechanism inside the bobbin portion. The drag mechanism includes a plurality of drag plates.

Japanese Patent Application Publication No. 2002-204640 discloses a spool that is mounted on a spool shaft by bearings. This type of spool is rotatably mounted on the spool shaft by two bearings, e.g., ball bearings. These bearings are disposed on the inner periphery of the bobbin portion, and are retained therein by a tubular retaining member that is non-rotatably mounted on the outer periphery of the spool shaft. A rear end portion of the retaining member contacts the annular member, and the retaining member is pushed or has a force exerted on it in a rearward direction by the bobbin portion. In addition, a through hole is formed in the retaining member, and a threaded portion is formed in the spool shaft that connects with the through hole. The retaining member is non-rotatably coupled to the spool shaft by inserting and screwing a pin member such as an Allen set-screw into the through hole and the threaded portion. Here, by contacting the rear end portion of the retaining member with the annular member, the drag mechanism can move and the drag plates can be pushed rearward because movement of the spool rearward is restricted.

There are times, while using the aforementioned conventional spinning reel, when one wants to weaken the drag mechanism to enhance the pleasure of catching a fish. Thus, when the drag mechanism is weakened, the pushing force that pushes the drag plates rearward will be reduced. When the pushing force of the drag plates is reduced, the force of the bobbin portion that pushes the retaining member rearward will be reduced. When this occurs, since the Allen set-screw passes through the through hole formed in the retaining member, wobbling may result due to the presence of a gap between the retaining member and the Allen set-screw. When the retaining member is wobbly, it may prevent the spool from smoothly moving forward and backward.

In view of the above, it will be apparent to those skilled in the art from this disclosure that there exists a need for an improved spool support structure for a spinning reel. This invention addresses this need in the art as well as other needs, which will become apparent to those skilled in the art from this disclosure.

SUMMARY OF THE INVENTION

An object of the present invention is to prevent a retaining member in a spool support structure of a spinning reel from wobbling.

A spool support structure for a spinning reel according to a first aspect of the present invention is a spool support structure for a spinning reel that is adapted to mount a spool rotatably on a spool shaft that is movable forward and backward with respect to a reel unit. The spool support structure includes at least one bearing, an annular member, a tubular retaining member, and a nut member. The bearing is disposed on an inner peripheral portion of the spool. The annular member is mounted to an outer periphery of the spool shaft so as to be prevented from moving rearward relative to the spool shaft. The tubular retaining member is configured to receive a force applied in a rearward force from the spool. The tubular retaining member includes an outer periphery being configured to retain the bearing, an inner periphery adapted to be non-rotatably mounted to the spool shaft, and a rear end portion contacting the annular member. The nut member is mounted to an outer periphery of the spool shaft, such that said retaining member is interposed and fixedly held between the annular member and the nut member.

This spool support structure includes the nut member, which is mounted to the outer periphery of the spool shaft to interpose and fixedly hold the retaining member between the nut member and the annular member. Given this structure, when, for example, the drag mechanism is weakened, wobbling of the retaining member can be prevented because the retaining member is interposed and fixedly held between the nut member and the annular member. Even if the force of the inner peripheral portion of the spool pushes the retaining member rearward, wobbling of the retaining member can be prevented by the aforementioned structure.

The spool support structure according to a second aspect of the present invention is the spool support structure of the first aspect, in which the retaining member includes a cylindrical portion and a disk portion. The inner periphery of the cylindrical portion is adapted to be non-rotatably mounted to the spool shaft. The disk portion is arranged on the outer periphery of the cylindrical portion. A front side surface of the disk portion is adapted to receive rearward force from the spool. Here, the pushing force of the inner peripheral portion of the spool can be uniformly received because the front side surface of the disk portion is pushed by the inner peripheral portion of the spool.

The spool support structure according to a third aspect of the present invention is the spool support structure of the second aspect, in which the cylindrical portion includes a first cylindrical portion and a second cylindrical portion. The first cylindrical portion is provided on a front side of the disk portion. Further, the second cylindrical portion is provided on a rear side of the disk portion. The bearings include a first bearing that is disposed on the outer periphery of the first cylindrical portion, and a second bearing that is disposed on the outer periphery of the second cylindrical portion. Here, the rotation of the spool with respect to the spool shaft can be made smoother by the first bearing and the second bearing.

The spool support structure according to a fourth aspect of the present invention is the spool support structure of the second or third aspect, further including spacer members that are mounted on the retaining member between the front side surface of the disk portion and the inner peripheral portion of the spool. Here, for example, the pushing force of the inner peripheral portion of the spool can be cushioned by the spacer members, which are composed of one or a plurality of annular members.

The spool support structure according to a fifth aspect of the present invention is the spool support structure of any of the first to fourth aspects, in which the retaining member is adapted to be non-rotatably mounted to the spool shaft by a pin member that is inserted into through holes formed in the cylindrical portion and the spool shaft. Here, the retaining member can be easily and reliably fixed to the spool shaft by, forming a through hole and a threaded portion in the cylindrical portion and the spool shaft, and inserting and screwing in the through hole a pin member having a threaded portion formed in the outer periphery thereof, such as an Allen set-screw.

The spool support structure according to a sixth aspect of the present invention is the spool support structure of any of the first to fifth aspects, in which a first threaded portion is formed in the inner periphery of the nut member, and a second threaded portion is formed in the outer periphery of the spool shaft. The second threaded portion is engaged with the first threaded portion of the nut member. Here, the nut member can be simply and reliably fixed to the spool shaft by screwing the nut member to the spool shaft.

The spool support structure according to a seventh aspect of the present invention is the spool support structure of any of the first to sixth aspects, further including a washer that is adapted to be mounted on the spool shaft between the nut member and the front end portion of the retaining member. Here, the nut member can be secured by mounting the washer between the nut member and the retaining member.

The spool support structure according to an eighth aspect of the present invention is the spool support structure of any of the third to seventh aspects, in which the outer diameter of the nut member is smaller than the inner diameter of the first bearing. Here, the spool can be detached with the first bearing mounted to the inner peripheral portion of the spool without removing the nut member.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the description that follows, "front" means the leftward direction, and "rear" means the rightward direction as viewed in FIGS. 1–4.

Figure 1:
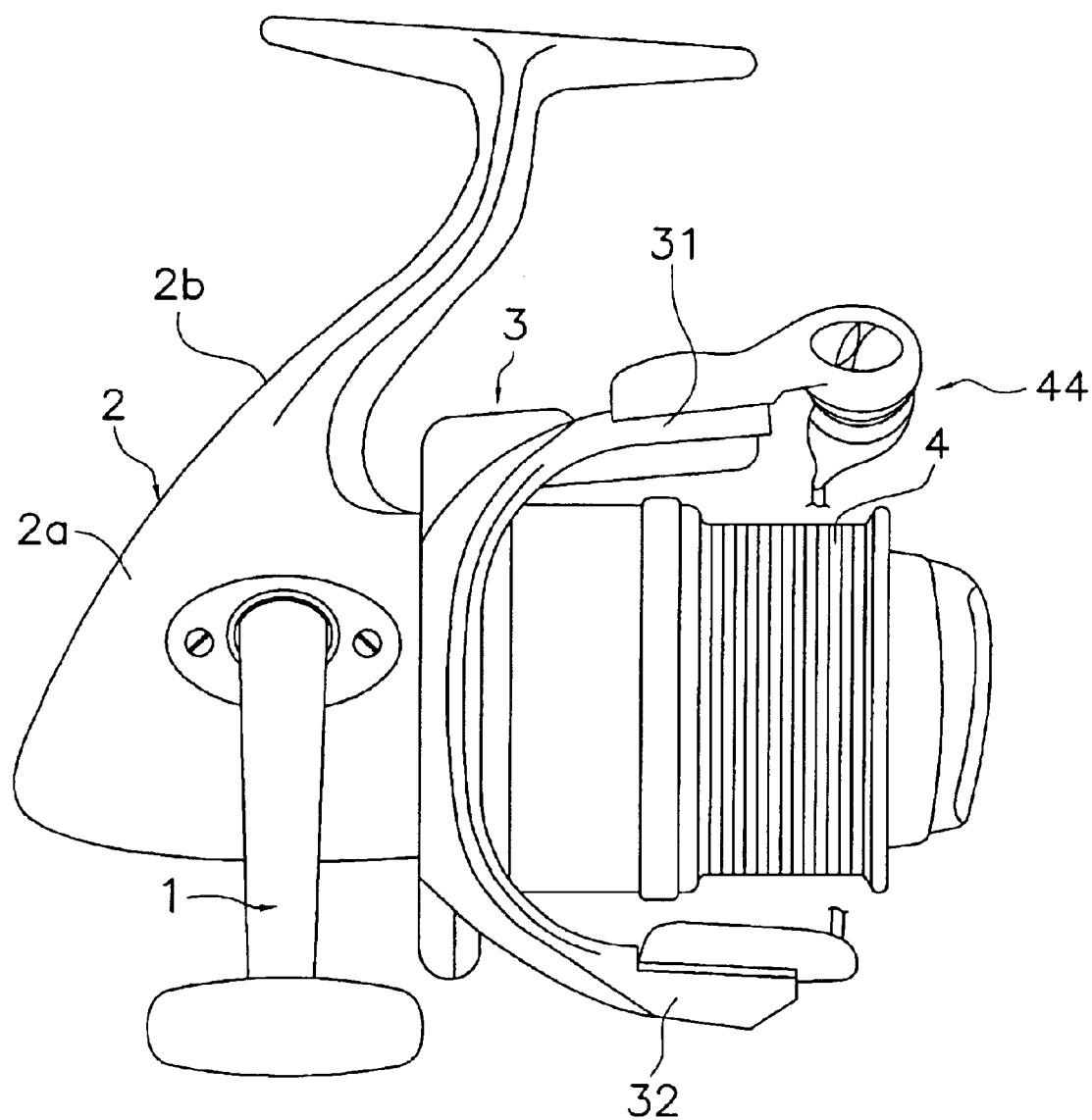
FIG. 1 is a right side elevational view of a spinning reel in accordance with a preferred embodiment of the present invention.

As shown in FIG. 1, a spinning reel in accordance with a preferred embodiment of the present invention includes a reel unit 2, a rotor 3, a spool 4, and a handle 1. The handle 1 is rotatably supported by the reel unit 2. The rotor 3 is rotatably supported on the front of the reel unit 2. The spool 4 has fishing line wound around the outer peripheral surface thereof, and is disposed on the front of the rotor 3 so that the spool 4 is movable forward and backward relative to the reel unit 2.

Figure 2:
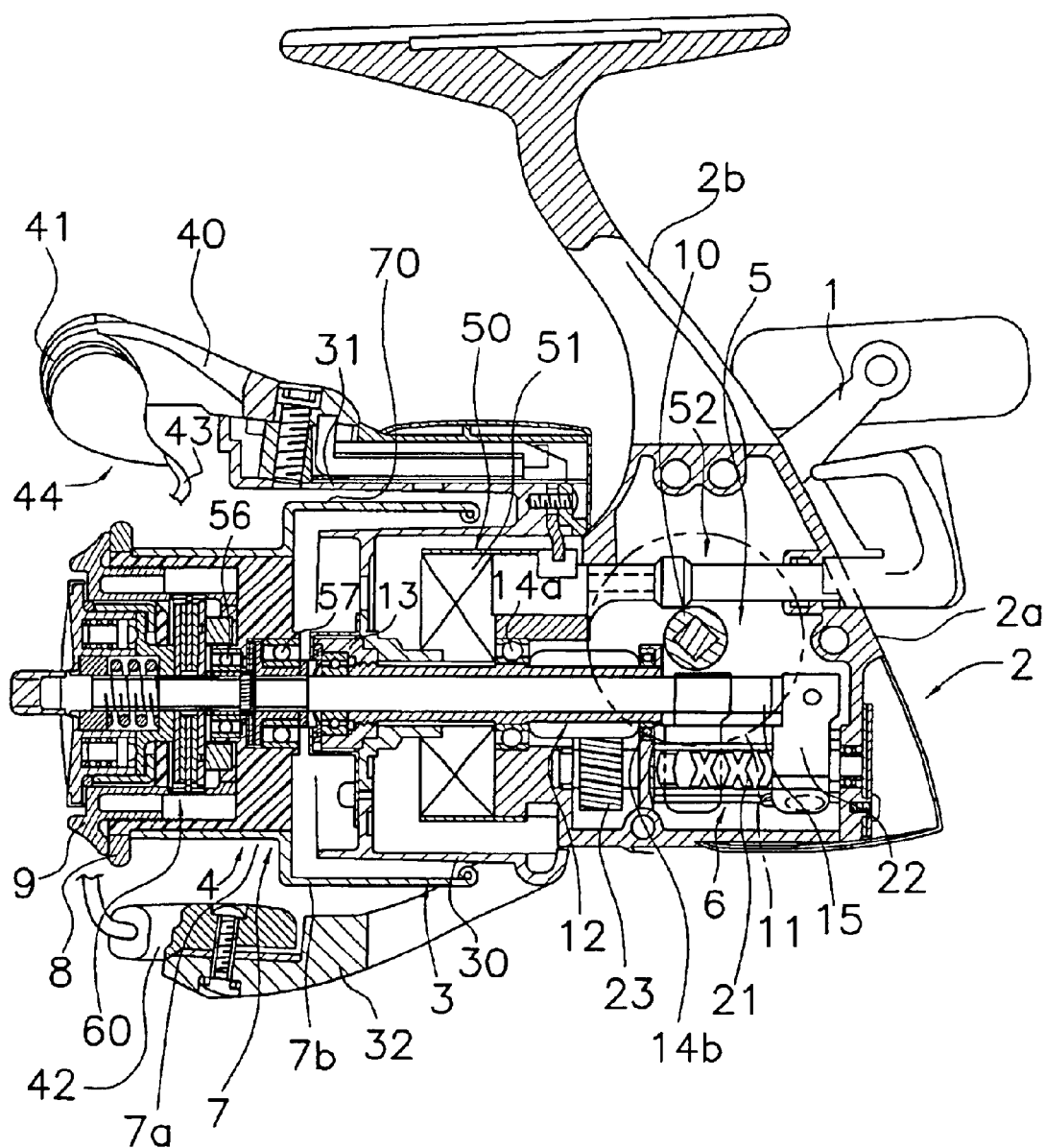
FIG. 2 is left side cross-sectional view of the spinning reel of FIG. 1.

The reel unit 2 includes a reel body 2a and a rod attachment leg 2b extending diagonally upward and forward from the reel body 2a. As shown in FIG. 2, the reel body 2a includes an interior space. A rotor drive mechanism 5 and an oscillating mechanism 6 are provided in the interior space. The rotor drive mechanism 5 rotates the rotor 3 in cooperation with rotation of the handle 1. The oscillating mechanism 6 moves the spool 4 forward and backward to wind fishing line uniformly onto the spool 4.

The rotor drive mechanism 5 includes a face gear 11 and a pinion gear 12. The face gear 11 rotates together with a handle shaft 10 onto which the handle 1 is fixedly coupled. The pinion gear 12 meshes with the face gear 11. The pinion gear 12 is formed in a hollow tubular shape, and a front portion of the pinion gear 12 extends through the center portion of the rotor 3. The pinion gear 12 is fixedly supported to the rotor 3 by a nut 13. The middle and the rear end of the pinion gear 12 are rotatably supported on the reel unit 2 via bearings 14a and 14b. The rotor drive mechanism is a component well known to an ordinary skill in the art. Therefore, further explanation and illustration of the rotor drive mechanism will be omitted herein.

The oscillating mechanism 6 moves a spool shaft 15 connected to the central portion of the spool 4 via a drag mechanism 60 forward and backward relative to the reel unit 2, and, thus, moving the spool 4 in the same directions. The oscillating mechanism 6 includes a worm 21, a slider 22, and an intermediate gear 23. The worm 21 is disposed below and parallel to the spool shaft 15. The slider 22 moves forward and backward along the worm 21. The intermediate gear 23 is fixedly attached to the front end of the worm 21. The rear end of the spool shaft 15 is non-rotatably coupled to the slider 22. The intermediate gear 23 meshes with the pinion gear 12. The oscillating mechanism is a component well known to an ordinary skill in the art. Therefore, further explanation and illustration of the oscillating mechanism will be omitted herein.

As shown in FIG. 2, the rotor 3 includes a cylindrical portion 30, and a first rotor arm 31 and a second rotor arm 32 arranged opposite to each other on the sides of the cylindrical portion 30. The cylindrical portion 30 and the first rotor arm 31 and second rotor arm 32 are, for example, formed unitarily from an aluminum alloy.

A first bail support member 40 is pivotably mounted to the outer peripheral side of the front end of the first rotor arm 31. A line roller 41 for guiding fishing line around the spool 4 is mounted to the front end of the first bail support member 40. In addition, a second bail support member 42 is pivotably mounted to an inner peripheral side of the front end of the second rotor arm 32.

A bail 43 that is a wire member bent approximately into a U-shape is fixedly attached between the line roller 41 and the second bail support member 42. The first and second bail support members 40 and 42, the line roller 41, and the bail 43 form a bail arm 44 that guides the fishing line to the spool 4. The bail arm 44 can pivot between a line-guiding posture shown in FIG. 2 and a line-releasing posture which flips from the line-guiding posture.

A reverse rotation check mechanism 50 for blocking and releasing reverse rotation of the rotor 3 is disposed in the interior of the cylindrical portion 30 of the rotor 3. As shown in FIG. 2, the reverse rotation check mechanism 50 includes a roller-type one-way clutch 51 having a freely rotating inner ring, and a switching mechanism 52 for switching the one-way clutch 51 between an operating state (in which reverse rotation is not possible) and a non-operating state (in which reverse rotation is possible). The reverse rotation check mechanism is a component well known to an ordinary skill in the art. Therefore, further explanation and illustration of the reverse rotation check mechanism will be omitted herein.

Figure 3:
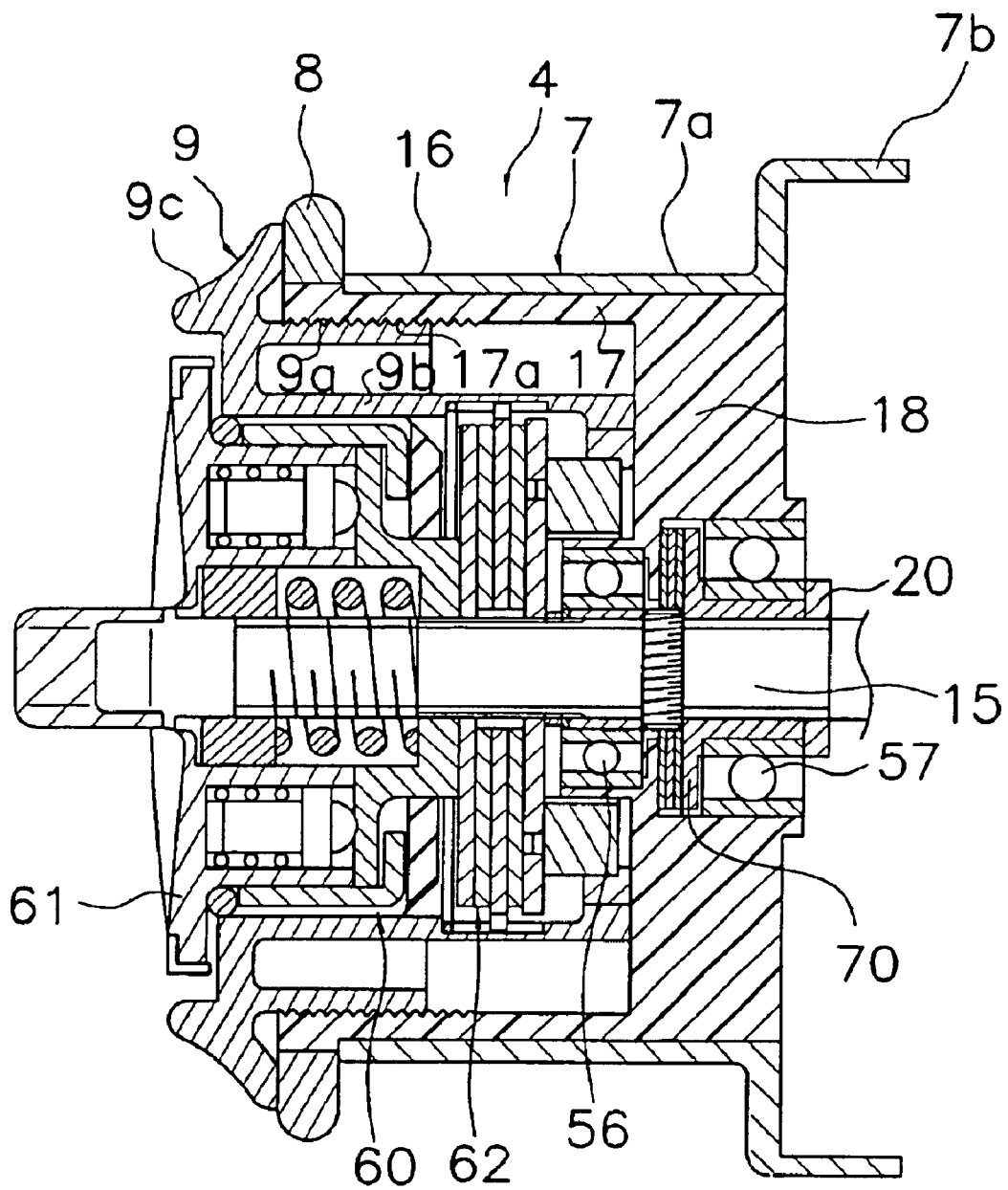
FIG. 3 is an enlarged cross-sectional view of the spinning reel spool of FIG. 1.
Figure 4:
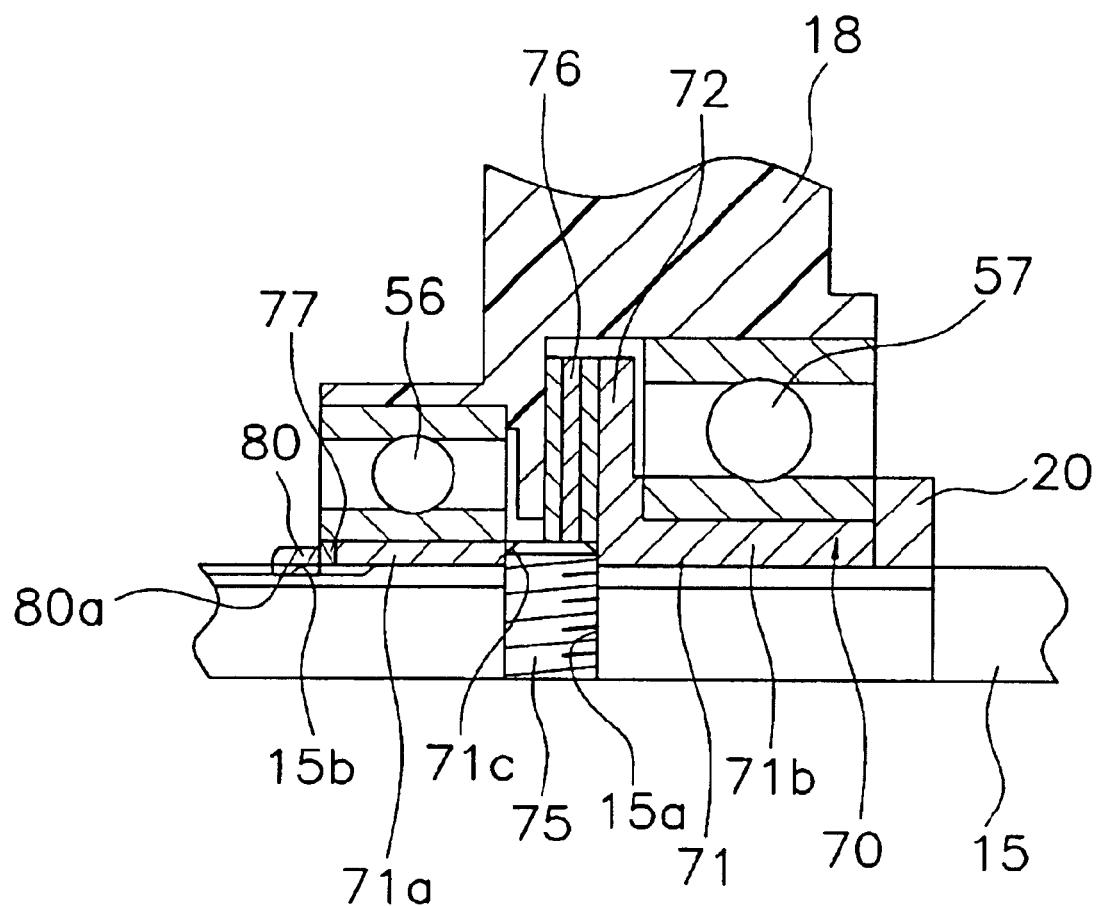
FIG. 4 is a right side enlarged view of a support portion of the spool of FIG. 1.

As shown in FIGS. 2–4, the spool 4 is disposed between the first rotor arm 31 and the second rotor arm 32 of the rotor 3, and is mounted via spool support structure 100 to the front end of the spool shaft 15 with the drag mechanism 60 interposed therebetween. As shown in FIG. 3, the spool 4 includes a cylindrical spool unit 7, a large diameter flange portion 8 and a flange fixing member 9. The cylindrical spool unit 7 has two levels, a large diameter level and a small diameter level. Fishing line is wound around the outer periphery of the cylindrical spool unit 7. The large diameter flange portion 8 is mounted on the front end of the spool unit 7. The flange fixing member 9 fixedly holds the flange portion 8 to the spool unit 7.

As shown in FIG. 3, the spool unit 7 is, for example, obtained by press working (such as drawing or the like) an aluminum alloy, and is a cylindrical member having large diameter and small diameter levels. The spool unit 7 is rotatably mounted on the spool shaft 15 by a first bearing 56 and a second bearing 57. The spool unit 7 includes a cylindrical bobbin portion 7a on the small diameter level around the outer periphery of which fishing line is wound, and a large diameter tubular skirt portion 7b on the large diameter level that is unitarily formed with the rear portion of the bobbin portion 7a.

As shown in FIG. 3, the bobbin portion 7a includes a tubular portion 16, a synthetic resin cylindrical portion 17, and an annular inner peripheral portion 18. The tubular portion 16 is formed from sheet metal into a tubular shape. The synthetic resin cylindrical portion 17 is a separate member and mounted to the inner peripheral side of the tubular portion 16. The annular inner peripheral portion 18 is unitarily formed with the cylindrical portion 17 on the rear end of the cylindrical portion 17. As shown in FIG. 3, a threaded portion 17a for mounting the flange fixing member 9 is formed in the inner peripheral surface of the tubular portion 17.

Referring to FIGS. 3 and 4, the spool support structure 100 of the present invention includes the first and second bearings 56 and 57, an annular member 20, a retaining member 70, and a nut member 80.

The first bearing 56 and the second bearing 57 are mounted on the inner peripheral side of the inner peripheral portion 18. Further, the first bearing 56 and the second bearing 57 are mounted on the spool shaft 15 via a tubular retaining member 70.

As shown in FIG. 4, the annular member 20 is a metal ring member that is mounted on the spool shaft 15 and is not movable backward relative to the spool shaft 15. The annular member 20 is in contact with the rear end portion of the retaining member 70, and accordingly restricts the rearward movement of the retaining member 70. The annular member 20 is also in contact with the rear end of the second bearing 57. In other words, the annular member 20 prevents the spool 4 from moving rearward. This way, the spool 4 can receive a drag force on the spool shaft 15 even if the inner peripheral portion 18 is pushed rearward by the drag mechanism 60.

The retaining member 70 is a tubular member that is pushed rearward by the inner peripheral portion 18. As shown in FIG. 4, the rear end portion of the retaining member 70 contacts with the annular member 20. The first bearing 56 and the second bearing 57 are retained on the outer periphery of the retaining member 70, and the inner periphery of the retaining member 70 is non-rotatably mounted to the spool shaft 15. The retaining member 70 includes a cylindrical portion 71 whose inner periphery is non-rotatably mounted to the spool shaft 15, and a disk portion 72 that is arranged on the outer periphery of the cylindrical portion 71. The front side surface of the disk portion 72 receives rearward force from the inner peripheral portion 18. The cylindrical portion 71 includes a first cylindrical portion 71a and a second cylindrical portion 71b. The first cylindrical portion 71a is arranged on the front side of the disk portion 72, and the first bearing 56 is disposed on the outer periphery of the first cylindrical portion 71a. The second cylindrical portion 71b is arranged on the rear side of the disk portion 72 and the second bearing 57 is disposed on the outer periphery of the second cylindrical portion 71b.

A through hole 71c that is formed in the first cylindrical portion 71a of the retaining member 70. A threaded through-hole 15a is formed on the spool shaft 15. The retaining member 70 is positioned such that the position of the through hole 71c coincides with that of the through-hole 15a. The retaining member 70 is non-rotatably coupled to the spool shaft 15 by a pin member 75 (such as an Allen set-screw) that screws into the threaded through-hole 15a formed in the spool shaft 15. In addition, preferably three spacer members 76 are mounted on the first cylindrical portion 71a in which the pin member 75 is mounted, in between the front side surface of the disk member 72 and the inner peripheral portion 18. More specifically, the three spacer members 76 are arranged between the front side surface of the disk member 72 and a back side surface of an axially extending portion of the inner peripheral portion 18 that is parallel or substantially parallel to the front side surface of the disk member 72. The retaining member 70 is interposed between a nut member 80 and the annular member 20. The nut member 80 contacts a washer 77 that is coupled to the spool shaft 15 and contacts the front end portion of the retaining member 70.

As shown in FIG. 4, the nut member 80 is mounted on the spool shaft 15 from the front of the spool shaft 15. A threaded portion 80a is formed in the inner periphery of the nut member 80. Thus, the nut member 80 is mounted on the spool shaft 15 by screwing the nut member 80 onto the threaded portion 15b formed on the outer periphery of the spool shaft 15. In addition, the washer 77 which is provided to secure the nut member 80, is mounted between the nut member 80 and the front end portion of the retaining member 70. Furthermore, the outer diameter of the nut member 80 is smaller than the inner diameter of the first bearing 56. Moreover, part of the inner periphery of the first bearing 56 preferably is adjacent the outer periphery of the washer 77 in the radial direction.

As shown in FIGS. 2 and 3, the skirt portion 7b is unitarily formed with the bobbin portion 7a in a tubular shape so that the skirt portion 7b covers the cylindrical portion 30 of the rotor 3. The skirt portion 7b is formed by drawing an aluminum alloy sheet.

As shown in FIG. 3, the flange portion 8 is a circular plate member made of metal or manufactured from a hard, scratch-resistant ceramic, and is formed so as to be inclined forward toward the outer circumference thereof. The flange portion 8 is interposed to be fixedly held between the bobbin portion 7a and the flange fixing member 9, which screws into the threaded portion 17a of the cylindrical portion 17.

As shown in FIG. 3, the flange fixing member 9 includes a tubular threaded portion 9a, a tubular drag accommodation portion 9b, and a contact portion 9c. The threaded portion 9a screws into the threaded portion 17a of the cylindrical portion 17. The drag accommodation portion 9b is unitarily formed with the inner circumferential side of the threaded portion 9a, and includes a space in the interior thereof that can accommodate a plurality of drag plates 62 (described below) of the drag mechanism 60. The contact portion 9c is provided on the front end of the threaded portion 9a and can come into contact with flange portion 8.

The drag mechanism 60 is mounted between the spool 4 and the spool shaft 15, and serves to apply drag force to the spool 4. The drag mechanism 60 includes a knob 61 for manually adjusting the drag force, and a plurality of drag plates 62 that are pressed toward the spool 4 by the knob 61. The drag mechanism is a component well known to an ordinary skill in the art. Therefore, further description and illustration of the drag mechanism will be omitted herein.

Next, the operation and movement of the reel will be described.

Referring initially to FIGS. 1 and 2, when casting, the bail arm 44 is flipped over to the line-releasing posture. Thus, the first bail support member 40 and the second bail support member 42 will pivot. In this state, the fishing rod is cast while grasping the fishing line with the index finger of the hand with which the fishing rod is held. When this occurs, the fishing line is released with a high degree of momentum due to the weight of the tackle. After the tackle lands in the water, when the handle 1 is rotated in the line-winding direction, the rotor 3 rotates in the line-winding direction due to the rotor drive mechanism 5. The bail arm 44 returns to the line-winding position due to a bail flipping mechanism (not shown in the figures), and the fishing line will be prevented from being released because reverse rotation of the rotor 3 is prevented.

When the fishing line is to be wound, the handle 1 is rotated in the line-winding direction. When this occurs, the rotation is then transmitted via the face gear 11 and the pinion gear 12 to the rotor 3, and rotates the rotor 3. When the rotor 3 rotates, the fishing line guided by the line roller 41 is wound around the spool 4.

As shown in FIG. 4, this type of spool 4 is assembled by first mounting the retaining member 70 on the spool shaft 15, and fixing the retaining member 70 thereto with the pin member 75. Next, the spacer members 76 are mounted onto the retaining member 70, and the inner peripheral portion 18 of the spool 4 is mounted. Then, the first bearing 56 is mounted from the front, and the second bearing 57 is mounted from the rear. Then, the annular member 20 is mounted to the spool shaft 15. Next, the washer 77 and the nut member 80 are mounted to the spool shaft 15 from the front of the spool shaft 15, such that the retaining member 70 is interposed and fixedly held between the nut member 80 and the annular member 20.

This type of spool 4 includes the nut member 80, which is mounted to the spool shaft 15 from the front of the spool shaft 15, and which fixedly holds the retaining member 70 by interposing the retaining member 70 between the nut member 80 and the annular member 20. Given this structure, when for example the drag mechanism 60 is adjusted to weaken drag and the rearward pressure applied from the inner peripheral portion 18 of the spool 4 toward the retaining member 70 decreases, wobbling of the retaining member 70 can be prevented because the retaining member 70 is interposed and fixedly held between the nut member 80 and the annular member 20 and therefore the retaining member 70 is supported stably.

Alternate Embodiments

In view of the similarity between the first and alternate embodiments, the parts of the second embodiment that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(a) The foregoing embodiment relates to a shallow-channel spool. However, the present invention is not limited thereby, and may be applied to spools for any sort of spinning reel.

(b) Two bearings, namely the first bearing 56 and second bearing 57 are employed in the foregoing embodiment. However, the present invention is not limited thereby, and may for example have a structure in which only one bearing is employed.

(c) In the foregoing embodiment, the retaining member 70 is fixedly coupled to the spool shaft 15 by the pin member 75 (such as an Allen set-screw). However, the method by which the retaining member 70 is fixedly coupled to the spool shaft 15 is not limited thereto.

(d) In the foregoing embodiment, the annular member 20 is a metal ring member. However, the annular member 20 may further include a structure in which a corrugated portion is formed in the periphery of the annular member 20, and a sound generating mechanism that contacts the corrugated portion when the spool 4 is rotated.

According to the present invention, wobbling of the retaining member of the spool support structure of the spinning reel can be prevented because the retaining member is interposed between the nut member and the annular member.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-355128. The entire disclosure of Japanese Patent Application No. 2002-355128 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool support structure for a spinning reel adapted to mount a spool rotatably on a spool shaft that is movable forward and backward with respect to a reel unit, said spool support structure comprising:
    at least one bearing being disposed on an inner peripheral portion of the spool;
    an annular member being mounted to an outer periphery of the spool shaft so as to be prevented from moving rearward relative to the spool shaft;
    a tubular retaining member being configured to receive a rearward force from the spool, said tubular retaining member having,
        an outer periphery being configured to retain said bearing,
        an inner periphery adapted to be non-rotatably mounted to the spool shaft, and
        a rear end portion contacting said annular member; and
    a nut member being mounted to the outer periphery of the spool shaft, such that said retaining member is interposed and fixedly held between said annular member and said nut member.

2. The spool support structure according to claim 1, wherein
    said retaining member includes a cylindrical portion whose inner periphery is adapted to be non-rotatably mounted to the spool shaft, and a disk portion that is arranged on an outer periphery of said cylindrical portion, a front side surface of said disk portion being adapted to receive rearward force from the spool.

3. The spool support structure according to claim 2, wherein
    said cylindrical portion includes a first cylindrical portion that is provided on a front side of said disk portion, and a second cylindrical portion that is provided on a rear side of said disk portion, and
    said at least one bearing includes a first bearing that is disposed on an outer periphery of said first cylindrical portion, and a second bearing that is disposed on an outer periphery of said second cylindrical portion.

4. The spool support structure according to claim 2, further comprising
    spacer members mounted on said retaining member such that said spacer members are adapted to be mounted between said front side surface of said disk portion and the inner peripheral portion of the spool.

5. The spool support structure according to claim 1, wherein
    said retaining member is adapted to be non-rotatably mounted to the spool shaft by a pin member that is inserted into through holes formed in said cylindrical portion and the spool shaft.

6. The spool support structure according to claim 1, wherein
    a first threaded portion is formed on an inner periphery of said nut member, and
    a second threaded portion is formed on an outer periphery of the spool shaft, the second threaded portion being adapted to engage with said first threaded portion of said nut member.

7. The spool support structure according to claim 1, further comprising
    a washer adapted to be mounted on the spool shaft between said nut member and a front end portion of said retaining member.

8. The spool support structure according to claim 3, wherein
    an outer diameter of said nut member is smaller than an inner diameter of said first bearing.

9. The spool support structure according to claim 5, wherein
    said pin member is an Allen set-screw.

10. The spool support structure according to claim 3, wherein
    said annular member is in contact with a rear end of said second bearing.

11. A spinning reel comprising:
    a reel unit;
    a handle being rotatably supported by said reel unit;
    a rotor being rotatably on a front of said reel unit;
    a spool being disposed on a front of said rotor, said spool being movable forward and backward relative to said reel unit; and
    a spool support structure mounting said spool rotatably on a spool shaft that is movable forward and backward with respect to said reel unit, said spool support structure including
        at least one bearing being disposed on an inner peripheral portion of said spool,
        an annular member being mounted to an outer periphery of said spool shaft so as to be prevented from moving rearward relative to said spool shaft,
        a tubular retaining member being configured to receive a rearward force from said spool, said tubular retaining member having an outer periphery being configured to retain said bearing, an inner periphery non-rotatably mounted to said spool shaft, and a rear end portion contacting said annular member, and
        a nut member being mounted to the outer periphery of said spool shaft, such that said retaining member is interposed and fixedly held between said annular member and said nut member.

12. The spinning reel according to claim 11, wherein
    said retaining member includes a cylindrical portion whose inner periphery is non-rotatably mounted to said spool shaft, and a disk portion that is arranged on an outer periphery of said cylindrical portion, a front side surface of said disk portion being configured to receive rearward force from said inner peripheral portion of said spool.

13. The spinning reel according to claim 12, wherein said cylindrical portion includes a first cylindrical portion that is provided on a front side of said disk portion, and a second cylindrical portion that is provided on a rear side of said disk portion, and said at least one bearing includes a first bearing that is disposed on an outer periphery of said first cylindrical portion, and a second bearing that is disposed on an outer periphery of said second cylindrical portion.

14. The spinning reel according to claim 12, further comprising spacer members mounted on said retaining member such that said spacer members are mounted between said front side surface of said disk portion and said inner peripheral portion of said spool.

15. The spinning reel according to claim 11, wherein said retaining member is non-rotatably mounted to said spool shaft by a pin member that is inserted into through holes formed in said cylindrical portion and said spool shaft.

16. The spinning reel according to claim 11, wherein a first threaded portion is formed on an inner periphery of said nut member, and a second threaded portion is formed on an outer periphery of said spool shaft, said second threaded portion engaging with said first threaded portion of said nut member.

17. The spinning reel according to claim 11, further comprising a washer mounted on said spool shaft between said nut member and a front end portion of said retaining member.

18. The spinning reel according to claim 13, wherein an outer diameter of said nut member is smaller than an inner diameter of said first bearing.

19. The spinning reel according to claim 11, wherein said pin member is an Allen set-screw.

20. The spinning reel according to claim 13, wherein said annular member is in contact with a rear end of said second bearing.

* * * * *